United States Patent
Zadesky et al.

(10) Patent No.: US 10,840,715 B2
(45) Date of Patent: *Nov. 17, 2020

(54) WIRELESS CHARGING CONTROL BASED ON ELECTRONIC DEVICE EVENTS

(71) Applicant: Apple Inc., Cupertino, CA (US)

(72) Inventors: Stephen P. Zadesky, Portola Valley, CA (US); Hongli Dai, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,933

(22) Filed: Dec. 27, 2019

(65) Prior Publication Data

US 2020/0136403 A1 Apr. 30, 2020

Related U.S. Application Data

(63) Continuation of application No. 16/218,431, filed on Dec. 12, 2018, now Pat. No. 10,523,021, which is a continuation of application No. 15/831,222, filed on Dec. 4, 2017, now Pat. No. 10,170,918, which is a continuation of application No. 15/086,730, filed on Mar. 31, 2016, now Pat. No. 9,837,835, which is a
(Continued)

(51) Int. Cl.
| | |
|---|---|
| *H01M 10/44* | (2006.01) |
| *H01M 10/46* | (2006.01) |
| *H02J 7/00* | (2006.01) |
| *H02J 7/04* | (2006.01) |
| *H02J 7/02* | (2016.01) |
| *H02J 50/00* | (2016.01) |

(52) U.S. Cl.
CPC .............. *H02J 7/0027* (2013.01); *H02J 7/00* (2013.01); *H02J 7/0029* (2013.01); *H02J 7/0069* (2020.01); *H02J 7/042* (2013.01); *H02J 7/00306* (2020.01); *H02J 7/025* (2013.01); *H02J 50/00* (2016.02); *H02J 2207/40* (2020.01)

(58) Field of Classification Search
CPC .. H02J 7/025; H02J 7/00; H02J 7/0021; H02J 7/0047; H02J 7/0073; H02J 7/0026
USPC ........ 320/107, 108, 125, 132, 137, 149, 152
See application file for complete search history.

(56) References Cited

U.S. PATENT DOCUMENTS

| | | |
|---|---|---|
| 2,798,895 A | 7/1957 | Nowotny |
| 2,798,896 A | 7/1957 | Bly |

(Continued)

FOREIGN PATENT DOCUMENTS

| | | |
|---|---|---|
| CN | 101702412 | 5/2010 |
| EP | 0792741 | 2/1986 |

(Continued)

*Primary Examiner* — Edward Tso
(74) *Attorney, Agent, or Firm* — Brownstein Hyatt Farber Schreck, LLP

(57) ABSTRACT

An electronic device may include a battery, and a charging system in electronic communication with the battery. The charging system may be configured to initiate a charging of the batter when the battery is in a partially-depleted state. The charging system may then discontinue the charging in response to the battery being charged to the threshold charge value, and may monitor the function of the electronic device to predict an event of the electronic device. After the event is predicted, the charging system may determine when to initiate a recharging process, so that the battery is fully charged when the event occurs.

20 Claims, 9 Drawing Sheets

Related U.S. Application Data continuation of application No. 14/201,663, filed on Mar. 7, 2014, now Pat. No. 9,455,582.

(56) References Cited

U.S. PATENT DOCUMENTS

| | | | |
|---|---|---|---|
| 4,152,825 | A | 5/1979 | Bruneau |
| 4,344,603 | A | 8/1982 | Hozumi |
| 4,455,026 | A | 6/1984 | Pinkus |
| 4,709,202 | A | 11/1987 | Koenck et al. |
| 5,238,222 | A | 8/1993 | Sumida |
| 5,396,163 | A | 3/1995 | Nor et al. |
| 5,580,676 | A | 12/1996 | Honda et al. |
| 5,736,834 | A | 4/1998 | Kuno |
| 5,895,440 | A | 4/1999 | Proctor et al. |
| 6,106,973 | A | 8/2000 | Sonozaki et al. |
| 6,174,164 | B1 | 1/2001 | Masjedi |
| 6,285,166 | B1 | 9/2001 | Cannon |
| 6,358,644 | B1 | 3/2002 | Shibata et al. |
| 6,368,744 | B1 | 4/2002 | Hatazawa et al. |
| 6,448,621 | B1 | 9/2002 | Thakur et al. |
| 6,528,204 | B1 | 3/2003 | Hikmet et al. |
| 6,549,756 | B1 | 4/2003 | Engstrom |
| 6,563,318 | B2 | 5/2003 | Kawakami et al. |
| 6,674,265 | B2 | 1/2004 | Yoshida et al. |
| 6,683,440 | B2 | 1/2004 | Kawakami et al. |
| 6,790,178 | B1 | 9/2004 | Mault et al. |
| 6,924,551 | B2 | 8/2005 | Rumer et al. |
| 7,012,405 | B2 | 3/2006 | Nishida et al. |
| 7,098,627 | B2 | 8/2006 | Nishida |
| 7,103,407 | B2 | 9/2006 | Hjelt et al. |
| 7,109,684 | B2 | 9/2006 | Takaoka et al. |
| 7,193,394 | B2 | 3/2007 | Ueda et al. |
| 7,270,910 | B2 | 9/2007 | Yahnker et al. |
| 7,282,891 | B2 | 10/2007 | Smallwood et al. |
| 7,288,340 | B2 | 10/2007 | Iwamoto |
| 7,356,923 | B2 | 4/2008 | Honer |
| 7,545,120 | B2 | 6/2009 | Breen et al. |
| 7,570,015 | B2 | 8/2009 | Bansal et al. |
| 7,622,895 | B1 | 11/2009 | Griffin |
| 7,663,064 | B2 | 2/2010 | Dutta et al. |
| 7,714,542 | B2 | 5/2010 | Lee et al. |
| 7,887,948 | B2 | 2/2011 | Jang et al. |
| 7,910,243 | B2 | 3/2011 | Koh et al. |
| 7,948,208 | B2 | 5/2011 | Partovi et al. |
| 7,952,322 | B2 | 5/2011 | Partovi et al. |
| 7,972,721 | B2 | 7/2011 | Kozu et al. |
| 7,976,981 | B2 | 7/2011 | Lee |
| 8,031,122 | B2 | 10/2011 | Jang et al. |
| 8,034,477 | B2 | 10/2011 | Yamada |
| 8,040,110 | B2 | 10/2011 | Al-Anbuky et al. |
| 8,119,278 | B2 | 2/2012 | Bailey et al. |
| 8,124,269 | B2 | 2/2012 | Takahashi et al. |
| 8,169,185 | B2 | 5/2012 | Partovi et al. |
| 8,183,826 | B2 | 5/2012 | Tuffner et al. |
| 8,203,305 | B1 | 6/2012 | Wortham et al. |
| 8,237,410 | B2 | 8/2012 | Young et al. |
| 8,241,786 | B2 | 8/2012 | Taniguchi et al. |
| 8,253,388 | B2 | 8/2012 | Cordes et al. |
| 8,259,013 | B2 | 9/2012 | Jang et al. |
| 8,260,371 | B2 | 9/2012 | Kawata et al. |
| 8,293,402 | B2 | 10/2012 | Lee |
| 8,330,427 | B2 | 12/2012 | Taniguchi et al. |
| 8,345,420 | B2 | 1/2013 | McClure et al. |
| 8,427,825 | B2 | 4/2013 | Szczypinski |
| 8,445,125 | B2 | 5/2013 | Baek et al. |
| 8,518,569 | B2 | 8/2013 | Murphy et al. |
| 8,526,998 | B2 | 9/2013 | Koide et al. |
| 8,548,761 | B2 | 10/2013 | Lim et al. |
| 8,558,509 | B2 | 10/2013 | He et al. |
| 8,598,850 | B2 | 12/2013 | Pisharodi |
| 8,603,670 | B2 | 12/2013 | Taniguchi et al. |
| 8,629,652 | B2 | 1/2014 | Partovi et al. |
| 8,629,654 | B2 | 1/2014 | Partovi et al. |
| 8,638,070 | B2 | 1/2014 | Maluf et al. |
| 8,679,674 | B2 | 3/2014 | Liang et al. |
| 8,778,529 | B2 | 7/2014 | Seo |
| 8,796,996 | B2 | 8/2014 | Nakatsuji et al. |
| 8,847,543 | B2 | 9/2014 | Yagi et al. |
| 8,854,012 | B2 | 10/2014 | Dai et al. |
| 8,890,470 | B2 | 11/2014 | Partovi |
| 8,896,264 | B2 | 11/2014 | Partovi |
| 8,901,881 | B2 | 12/2014 | Partovi |
| 8,920,949 | B2 | 12/2014 | Hashimoto et al. |
| 8,936,653 | B2 | 1/2015 | Kim et al. |
| 8,942,409 | B2 | 1/2015 | Kantor et al. |
| 8,947,047 | B2 | 2/2015 | Partovi et al. |
| 8,989,821 | B2 | 3/2015 | Pope et al. |
| 8,999,566 | B2 | 4/2015 | Chung et al. |
| 9,040,192 | B2 | 5/2015 | Lee et al. |
| 9,048,679 | B2 | 6/2015 | Patino |
| 9,081,068 | B2 | 7/2015 | Mattisson et al. |
| 9,106,083 | B2 | 8/2015 | Partovi |
| 9,112,362 | B2 | 8/2015 | Partovi |
| 9,112,363 | B2 | 8/2015 | Partovi |
| 9,112,364 | B2 | 8/2015 | Partovi |
| 9,136,510 | B2 | 9/2015 | Werner |
| 9,172,088 | B2 | 10/2015 | Loveness et al. |
| 9,178,369 | B2 | 11/2015 | Partovi |
| 9,276,437 | B2 | 3/2016 | Partovi et al. |
| 9,301,034 | B2 | 3/2016 | Kantor et al. |
| 9,343,716 | B2 | 5/2016 | Rothkopf et al. |
| 9,350,188 | B2 | 5/2016 | Hasebe et al. |
| 9,356,459 | B2 | 5/2016 | Chung |
| 9,356,659 | B2 | 5/2016 | Partovi |
| 9,368,995 | B2 | 6/2016 | Nishino et al. |
| 9,379,565 | B2 | 6/2016 | Woo |
| 9,385,353 | B2 | 7/2016 | Byun |
| 9,455,582 | B2 | 9/2016 | Zadesky et al. |
| 9,461,501 | B2 | 10/2016 | Partovi et al. |
| 9,476,946 | B2 | 10/2016 | Schlag et al. |
| 9,479,007 | B1 | 10/2016 | Jol et al. |
| 9,496,732 | B2 | 11/2016 | Partovi |
| 9,511,679 | B2 | 12/2016 | Izumi |
| 9,575,526 | B2 | 2/2017 | Nagahama et al. |
| 9,577,440 | B2 | 2/2017 | Partovi et al. |
| 9,582,034 | B2 | 2/2017 | von Badinski et al. |
| 9,593,969 | B2 | 3/2017 | King |
| 9,634,295 | B2 | 4/2017 | Dube |
| 9,692,949 | B2 | 6/2017 | Hollinger et al. |
| 9,720,467 | B2 | 8/2017 | Jain et al. |
| 9,722,447 | B2 | 8/2017 | Partovi |
| 9,768,473 | B2 | 9/2017 | Roh et al. |
| 9,774,193 | B2 | 9/2017 | Gaylo et al. |
| 9,793,721 | B2 | 10/2017 | Partovi et al. |
| 9,812,680 | B2 | 11/2017 | Werner et al. |
| 9,837,835 | B2 | 12/2017 | Zadesky et al. |
| 9,837,846 | B2 | 12/2017 | Partovi |
| 9,879,652 | B2 | 1/2018 | Eden et al. |
| 9,917,335 | B2 | 3/2018 | Jarvis et al. |
| 10,115,520 | B2 | 10/2018 | Partovi |
| 10,523,021 | B2 * | 12/2019 | Zadesky ............... H02J 7/0069 |
| 2002/0094475 | A1 | 7/2002 | Aoyama |
| 2003/0129483 | A1 | 7/2003 | Gross |
| 2004/0130294 | A1 | 7/2004 | Ng et al. |
| 2005/0142439 | A1 | 6/2005 | Lee et al. |
| 2005/0225299 | A1 | 10/2005 | Petrovic |
| 2006/0164035 | A1 | 7/2006 | Van Beek et al. |
| 2007/0260136 | A1 | 11/2007 | Hunter |
| 2007/0264535 | A1 | 11/2007 | Lee et al. |
| 2008/0001573 | A1 | 1/2008 | Carey |
| 2008/0286644 | A1 | 11/2008 | Yeo |
| 2009/0243549 | A1 | 10/2009 | Matsumura et al. |
| 2009/0317708 | A1 | 12/2009 | Brandl et al. |
| 2010/0026240 | A1 | 2/2010 | Jiang et al. |
| 2010/0052603 | A1 | 3/2010 | Bourilkov et al. |
| 2010/0081049 | A1 | 4/2010 | Holl et al. |
| 2010/0316911 | A1 | 12/2010 | Tesson et al. |
| 2011/0014954 | A1 | 1/2011 | Dossas et al. |
| 2011/0043309 | A1 | 2/2011 | Wamala et al. |
| 2011/0050164 | A1 | 3/2011 | Partovi et al. |
| 2011/0175569 | A1 | 7/2011 | Austin |
| 2011/0215480 | A1 | 9/2011 | Gorczyca et al. |
| 2011/0223447 | A1 | 9/2011 | Ignor et al. |
| 2011/0236727 | A1 | 9/2011 | Jang |

(56) References Cited

U.S. PATENT DOCUMENTS

| | | |
|---|---|---|
| 2012/0116176 A1 | 5/2012 | Moravec et al. |
| 2012/0121944 A1 | 5/2012 | Yamamoto et al. |
| 2012/0176095 A1 | 7/2012 | Okuda et al. |
| 2012/0286739 A1 | 11/2012 | O'Brien et al. |
| 2012/0305605 A1 | 12/2012 | Vaussaux et al. |
| 2012/0319653 A1 | 12/2012 | Kumar et al. |
| 2013/0071696 A1 | 3/2013 | Kim et al. |
| 2013/0093388 A1 | 4/2013 | Partovi |
| 2013/0119942 A1 | 5/2013 | Sutarwala et al. |
| 2013/0260677 A1 | 10/2013 | Partovi |
| 2013/0271069 A1 | 10/2013 | Partovi |
| 2013/0285605 A1 | 10/2013 | Partovi |
| 2014/0055085 A1 | 2/2014 | Downey et al. |
| 2014/0147703 A1 | 5/2014 | Werner et al. |
| 2014/0191568 A1 | 7/2014 | Partovi |
| 2015/0130412 A1 | 5/2015 | Partovi |
| 2015/0188324 A1 | 7/2015 | Nicholson et al. |
| 2015/0255776 A1 | 9/2015 | Dabov |
| 2015/0276885 A1 | 10/2015 | Hariharasudhan et al. |
| 2015/0357859 A1 | 12/2015 | Pourdarvish et al. |
| 2016/0049821 A1 | 2/2016 | Aridome |
| 2016/0064960 A1 | 3/2016 | DiCarlo et al. |
| 2016/0064961 A1 | 3/2016 | DiCarlo et al. |
| 2016/0260945 A1 | 9/2016 | Rothkopf et al. |
| 2016/0276842 A1 | 9/2016 | Shizuno et al. |
| 2018/0097377 A1 | 4/2018 | Zadesky et al. |
| 2018/0159183 A1 | 6/2018 | Jarvis et al. |

FOREIGN PATENT DOCUMENTS

| | | |
|---|---|---|
| EP | 1931010 | 6/2008 |
| EP | 2540221 | 1/2013 |
| EP | 2653053 | 10/2013 |
| JP | 61032951 | 2/1986 |
| JP | 63314770 | 12/1988 |
| JP | 10012200 | 1/1998 |
| JP | 2000058018 | 2/2000 |
| JP | 2001118547 | 4/2001 |
| JP | 2001250515 | 9/2001 |
| JP | 2001250516 | 9/2001 |
| JP | 2001332752 | 11/2001 |
| JP | 2002142378 | 5/2002 |
| JP | 2005108750 | 4/2005 |
| JP | 2005129260 | 5/2005 |
| JP | 2005268138 | 9/2005 |
| JP | 2007048725 | 2/2007 |
| JP | 2007165200 | 6/2007 |
| JP | 2010021074 | 1/2010 |
| KR | 20010007769 | 2/2005 |
| KR | 20090075396 | 7/2009 |
| WO | WO00/41252 | 7/2000 |
| WO | WO2008/023199 | 2/2008 |
| WO | WO2011/000239 | 1/2011 |
| WO | WO2011/095758 | 8/2011 |

\* cited by examiner

WIRELESS CHARGING CONTROL BASED ON ELECTRONIC DEVICE EVENTS

CROSS-REFERENCE TO RELATED APPLICATION(S)

This application is a continuation patent application of U.S. patent application Ser. No. 16/218,431, filed Dec. 12, 2018 and titled "Wireless Charging Control Based on Electronic Device Events," which is a continuation patent application of U.S. patent application Ser. No. 15/831,222, filed Dec. 4, 2017 and titled "Electronic Device Wireless Charging System," now U.S. Pat. No. 10,170,918, which is a continuation patent application of U.S. Ser. No. 15/086,730, filed Mar. 31, 2016 and titled "Electronic Device Charging System," now U.S. Pat. No. 9,837,835, which is a continuation patent application of U.S. patent application Ser. No. 14/201,663, filed Mar. 7, 2014 and titled "Electronic Device and Charging Device for Electronic Device," now U.S. Pat. No. 9,455,582, the disclosures of which are hereby incorporated herein by reference in their entireties.

TECHNICAL FIELD

The disclosure relates generally to electronic devices and, more particularly, to an electronic device, a charging device, and a method for charging the battery of the electronic device.

BACKGROUND

Current electronic devices continue to become more prevalent in day-to-day activities. For example, smart phones and tablet computers continue to grow in popularity and provide everyday personal and business functions to its users. These electronic devices are usually operational for the majority of a typical day, where a user may utilize the electronic device to send messages (e.g., text and e-mail), work on documents, play games, conduct phone calls, and perform other personal and/or business specific tasks.

With extensive daily use, a long battery life is one of the most important operational characteristics of the electronic device. However, as the overall size of the electronic device continues to get smaller, the internal space of the electronic device also gets smaller. This reduced internal space may result in a smaller battery as well. With a smaller battery in an electronic device, the battery may need to be charged daily—or even several times a day.

The charging of the electronic device typically includes electrically coupling the electronic device to a charging device. The charging device may provide an electrical current to the electronic device, and the electronic device may convert the current to charge the battery. Conventional charging devices for the electronic device may charge a depleted battery to a threshold charge value (e.g., 100%). Once the battery reaches the threshold charge value, the conventional charging device may stop providing an electrical current to the electronic device, which may ultimately allow the maximum charged battery to deplete. When the battery depletes to a predetermined minimum charge value (e.g., 90%), the charging device may once again provide electrical current to the electronic device to charge the battery to the threshold charge value again. When an electronic device remains connected to the conventional charging device, the cycle between threshold charge value and predetermined minimum charge value may occur several times.

With each charge to the threshold charge value and/or each cycle between the threshold charge value and the predetermined minimum charge value, the life of certain types of batteries may be reduced. More specifically, each time such batteries cycle between the threshold charge value and predetermined minimum charge value during the conventional charging process, the battery's ability to hold a maximum charge for a duration of time may be substantially reduced. Over time the reduction in the battery's ability to hold the charge may result in the battery needing to be charged several times a day. When the battery cannot be charged several times a day, the battery may be completely depleted and the electronic device may be inoperable (e.g., shutdown due to lack of power).

SUMMARY

Generally, embodiments discussed herein are related to an electronic device, a charging device and a method for charging the battery of the electronic device. The electronic device may include a battery and a charging system for charging the battery. The charging system may be configured to monitor the activities and/or events of the electronic device to ensure that the battery is substantially charged prior to, or immediately after the occurrence of an event. That is, the charging of the battery may be dependent upon the monitoring and/or the occurrence of activities and events of the electronic device, and not cycling between threshold charge values and minimum charge values. As a result, the charging system of the electronic device may substantially prevent undesirable depletion of the battery's ability to maintain a charge. That is, by eliminating the cycling charging of the battery of the electronic device, the charging system of the electronic device may minimize and substantially prevent the depletion of the battery's ability to maintain a charge.

One embodiment may include an electronic device. The electronic device may include a battery and a charging system in electronic communication with the battery. The charging system may be configured to charge at least a partially-depleted battery to a threshold charge value, discontinue the charging in response to the battery being charged to the threshold charge value, and monitor the function of the electronic device to detect at least one of an anticipated event and an unanticipated event of the electronic device. Additionally, the charging system may be configured to recharge the battery in response to detecting one of the anticipated event occurring subsequent to the recharging of the battery or the unanticipated event occurring immediately before the recharging of the battery.

Another embodiment may include a charging device for an electronic device. The charging device may include a connection portion electrically coupled to a battery of the electronic device, and a charging system in electronic communication with the battery of the electronic device. The charging system may be configured to charge at least a partially-depleted battery to a threshold charge value, discontinue the charging in response to the battery being charged to the threshold charge value, and monitor the function of the electronic device to detect at least one of an anticipated event and an unanticipated event of the electronic device. Additionally, the charging system may be configured to recharge the battery in response to detecting one of the anticipated event occurring subsequent to the recharging of the battery or the unanticipated event occurring immediately before the recharging of the battery.

A further embodiment may include a method for charging a battery of an electronic device. The method may include charging at least a partially-depleted battery for the electronic device to a threshold charge value, discontinuing the charging in response to the battery being charged to the threshold charge value, and monitoring the function of the electronic device to detect at least one of an anticipated event and an unanticipated event of the electronic device. The method may also include recharging the battery in response to detecting one of the anticipated event occurring subsequent to the reactivation of the charging device or the unanticipated event occurring immediately before the reactivation of the charging device.

BRIEF DESCRIPTION OF THE DRAWINGS

The disclosure will be readily understood by the following detailed description in conjunction with the accompanying drawings, wherein like reference numerals designate like structural elements, and in which.

Figure 1:
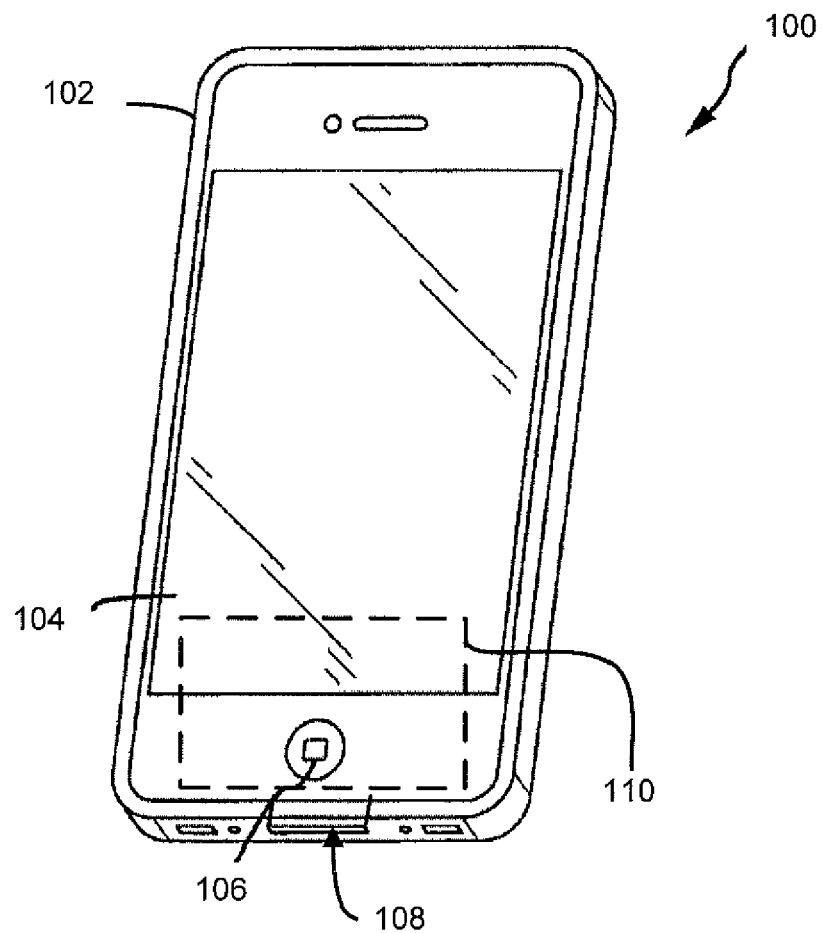
FIG. 1A shows an illustrative perspective view of an electronic device including a battery, according to embodiments.
FIG. 1B shows an illustrative block diagram of the electronic device including the battery as shown in FIG. 1A, according to embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to electronic devices and, more particularly, to a charging device and a method for charging a battery of an electronic device.

In a particular embodiment, the electronic device may include a battery and a charging system for charging the battery. The charging system may be configured to monitor the activities and/or events of the electronic device to ensure that the battery is substantially charged prior to, or immediately after the occurrence of, an event. That is, the charging of the battery may be dependent upon the monitoring and/or the occurrence of activities and events of electronic device, and not upon cycling between threshold charge values and minimum charge values. As a result, the charging system of the electronic device may substantially prevent undesirable depletion of the battery's ability to maintain a charge. By eliminating the cycling charging of the battery of the electronic device, the charging system of the electronic device may minimize and substantially prevent the depletion of the battery's ability to maintain a charge.

The electronic device may include a battery and a charging system in electronic communication with the battery. The charging system may be configured to charge at least a partially-depleted battery to a threshold charge value, discontinue the charging in response to the battery being charged to the threshold charge value, and monitor the function of the electronic device to detect at least one of an anticipated event and an unanticipated event of the electronic device. Additionally the charging system may be configured to recharge the battery in response to detecting an anticipated event, occurring subsequent to the recharging of the battery, or an unanticipated event, occurring immediately before the recharging of the battery. A charging device and charging methods are also disclosed.

These and other embodiments are discussed below with reference to FIGS. 1A-7. However, those skilled in the art will readily appreciate that the detailed description given herein with respect to these Figures is for explanatory purposes only and should not be construed as limiting.

FIG. 1A shows a perspective view of one example of an electronic device that can include, or be connected to, a charging system. In the illustrated embodiment, the electronic device 100 is implemented as a smart telephone. Other embodiments may implement the electronic device differently, such as, for example, a laptop or desktop computer, a tablet computing device, a gaming device, a display, a digital music player, a wearable computing device or display such as a watch or glasses, and other types of electronic devices that may receive biometric data from a biometric sensing device.

The electronic device 100 includes an enclosure 102 at least partially surrounding a display 104 and one or more buttons 106 or input devices. The enclosure 102 may form an outer surface, or partial outer surface, and protective case for the internal components of the electronic device 100, and may at least partially surround the display 104. The enclosure 102 may be formed of one or more components operably connected together, such as a front piece and a back piece. Alternatively, the enclosure 102 may be formed of a single piece operably connected to the display 104.

The electronic device 100 may also include a battery charging port 108. As shown in FIG. 1A, the battery charging port 108 may be in electronic communication with the battery 110 of the electronic device 100. More specifically, the battery charging port 108 may include an aperture configured to receive a portion of a charging device 200 (see FIGS. 2A and 2B) for charging the battery 110. That is, the battery charging port 108 may be coupled to the charging device 200, such that the charging device 200 may provide an electric current to the electronic device 100 to substantially charge the battery 110, as discussed herein.

Figure 1B:
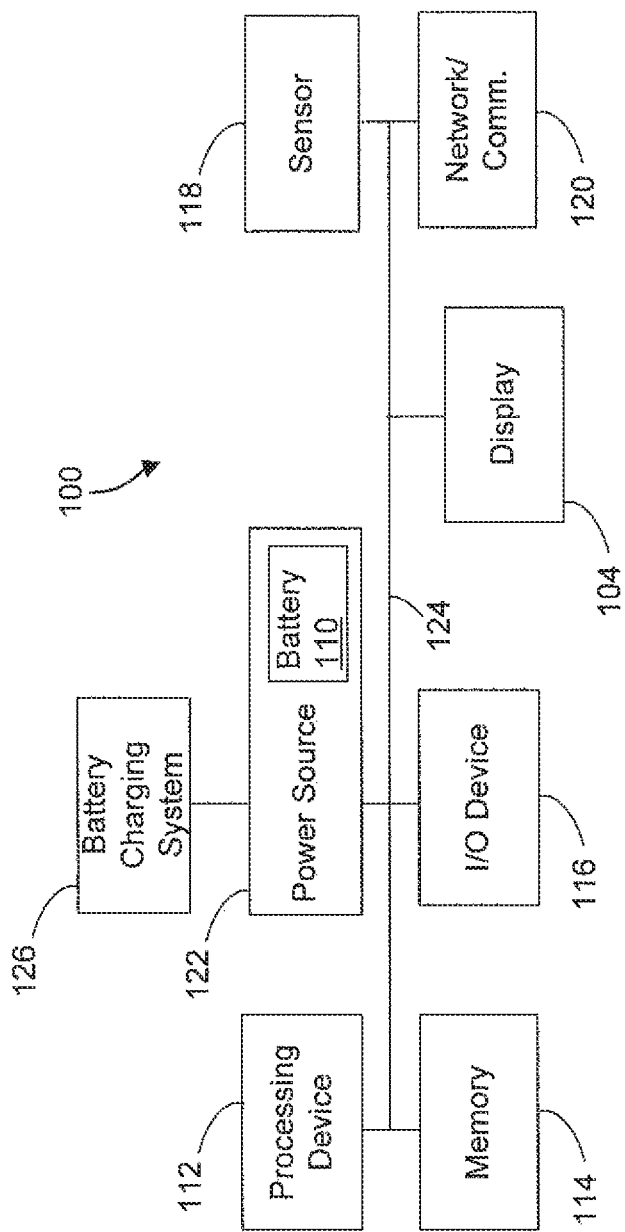

FIG. 1B is an illustrative block diagram of the electronic device 100 shown in FIG. 1A. The electronic device 100 may include the display 104, a processing device 112, memory 114, an input/output (I/O) device 116, a sensor 118, a network communications interface 120, and a power source 122. The display 104 may display an image or video output for the electronic device 100. The display 104 may also provide an input region for one or more input devices 116, such as, for example, a touch sensing device and/or a fingerprint sensing device. The display 104 may be substantially any size and may be positioned substantially anywhere on the electronic device 100.

The processing device 112 may control some or all of the operations of the electronic device 100. The processing device 112 may communicate, either directly or indirectly, with substantially all of the components of the electronic device 100. For example, a system bus or signal line 124 or other communication mechanisms may provide communication between the processing device 112, the memory 114, the I/O device 116, the sensor 118, the network communications interface 120, and/or the power source 122. The processing device 112 may be implemented as any electronic device capable of processing, receiving, or transmitting data or instructions. For example, the processing device 112 may be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 114 may store electronic data that may be used by the electronic device 100. More specifically, in a non-limiting example, memory 114 for the electronic device 100 may store electrical data or content relating to the charging of the battery 110, as discussed herein. The memory 114 may be configured as any type of memory. By way of example only, the memory 114 may be implemented as random access memory, read-only memory, Flash memory, removable memory, or other types of storage elements, or combinations of such devices.

The electronic device 100 may also include one or more sensors 118 positioned substantially anywhere on the electronic device 100. The sensor(s) 118 may be any conventional sensor for determining an amount of electrical current being provided to the electronic device 100, or a sensor configured to determine a time for receiving electrical current during the charging processes discussed herein.

The power source 122 may be implemented with any device capable of providing energy to the electronic device 100. That is, the power source 122 may be one or more disposable batteries or rechargeable batteries (e.g., battery 110) of the electronic device 100. More specifically, as shown in FIG. 1B, the power source 122 may include the battery 110. Additionally, and as discussed in detail herein, the power source 122 may include a connection cable or the charging device 200 (see FIGS. 2A and 2B), that may connect the electronic device 100, and specifically the battery 110, to another power source such as a wall outlet, USB outlet or port, or 12V outlet.

The power source 122 may be connected to a battery charging system 126 (hereafter, the "charging system 126"). The charging system 126 may be included within the electronic device 100, in electronic communication with the power source 122 and/or the battery 110, or the charging system 126 may be included directly within the power source 122, as discussed herein. The charging system 126 is generally configured to charge the battery 110 of the electronic device 100 based on events (e.g., interactions and/or programs) that may take place on/with the electronic device 100. That is, and as discussed in detail herein, the charging system 126 may be configured to charge the battery 110 based on anticipated and/or unanticipated events of the electronic device 100, and not on predetermined charge values of the electronic device 100. In one embodiment, the charging system 126 may include a processing device and a memory. Any suitable processing device and memory may be used in the charging system 126. It is understood that other components may be included in the charging system 126 in some embodiments. The charging system 126 is described in more detail in conjunction with FIGS. 3-7.

Figure 2A:
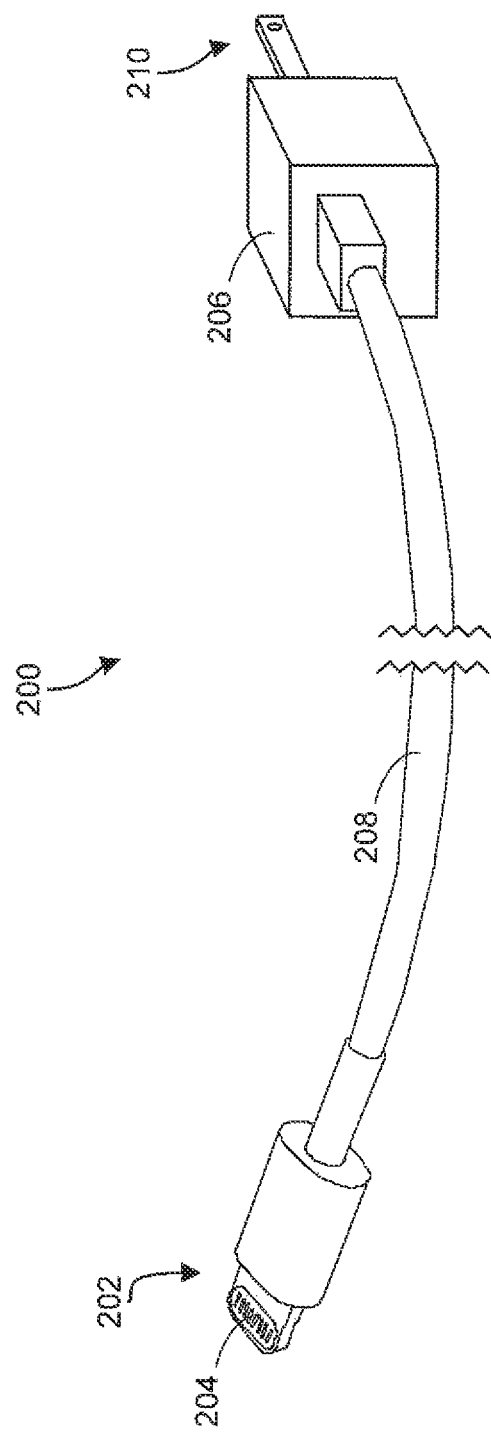
FIG. 2A shows an illustrative perspective view of a charging device including a charging system, according to embodiments.
Figure 2B:
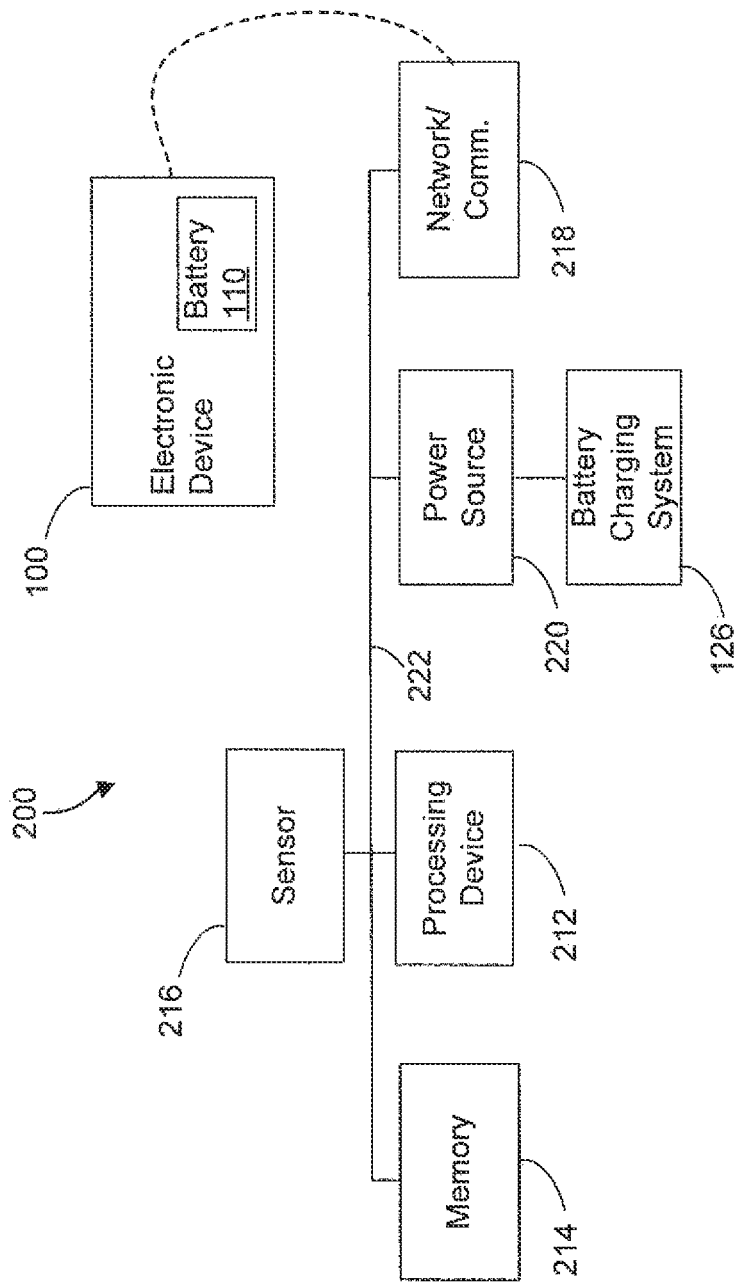
FIG. 2B shows an illustrative block diagram of the charging device including the charging system as shown in FIG. 2A, according to embodiments.

As discussed above, the battery 110 of the electronic device 100 (see FIG. 1A) may be charged using the charging device 200, as shown in FIGS. 2A-2B. More specifically, as shown in FIG. 2A, the charging device 200 may include a connection portion 202 configured to be coupled to the electronic device 100 (FIG. 1A), and in electronic communication with the battery 110 to provide an electrical current to charge the battery 110. The charging device 200 may include a plurality of contact pins 204 positioned on the connection portion 202. Contact pins 204 may contact corresponding contact pins (not shown) positioned within the battery charging port 108 of the electronic device 100 for transferring the electrical current provided by the charging device 200 to the electronic device 100, to ultimately charge the battery 110.

As shown in FIG. 2A, the connection portion 202 may be coupled to the housing 206 of the charging device 200 via insulated wires 208. More specifically, insulated wires 208 may be positioned between the connection portion 202 and the housing 206 of the charging device 200, and may substantially provide an electrical current from the housing 206 to the connection portion 202 to be subsequently provided to the electronic device 100. The housing 206 may be configured to draw an electrical current from any conventional power source. For example, as shown in FIG. 2A, the housing 206 may include a two-prong AC power plug 210, which may be configured to be inserted into a conventional wall socket or plug to draw an electrical current to the charging device 200. Although shown as an AC power plug 210, the housing 206 and/or the charging device 200 may be provided with the electrical current from any conventional power supply including, but not limited to, a USB port or a 12V outlet.

As discussed above, the charging device 200 may be configured to provide an electrical current to the electronic device 100 including the charging system 126, to charge the battery 110. In an alternative embodiment, the charging device 200, as shown in FIG. 2A, may include the charging system 126, rather than the electronic device 100, and the charging device 200 may be configured to charge the battery 110 using the processes discussed herein with respect to FIG. 3. That is, the charging system 126 may be distinct from the electronic device 100 and may be included in the housing 206 of the charging device 200.

Although shown as a single device that may be electrically coupled to the electronic device 100, the charging device 200 may include an inductive or wireless charging system that may include the charging system 126. That is, the charging device 200 may be configured as an inductive or wireless charging system including the charging system 126, that may be configured to charge the battery 110 of the electronic device 100 using the processes discussed herein with respect to FIG. 3.

FIG. 2B is an illustrative block diagram of the charging device 200 shown in FIG. 2A. The charging device 200 may include a processing device 212, memory 214, sensors 216, a network communications interface 218, and a power source 220. The charging device 200 may include substantially similar components as those components of the electronic device 100 discussed with respect to FIG. 1B. As such, redundant explanation of those components may be omitted for clarity.

The processing device 212 may control some or all of the operations of the charging device 200. The processing device 212 may communicate, either directly or indirectly, with substantially all of the components of the charging device 200. For example, a system bus, signal line 222, or other communication mechanisms may provide communication between the processing device 212, memory 214, sensors 216, the network communications interface 218 and/or the power source 220. The processing device 212 may be implemented as any electronic device capable of processing, receiving, or transmitting data or instructions. For example, the processing device 212 may be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

It should be noted that FIGS. 1A-2B are illustrative only. In other examples, an electronic device and/or charging device may include fewer or more components than those shown in FIGS. 1A-2B.

Figure 3:
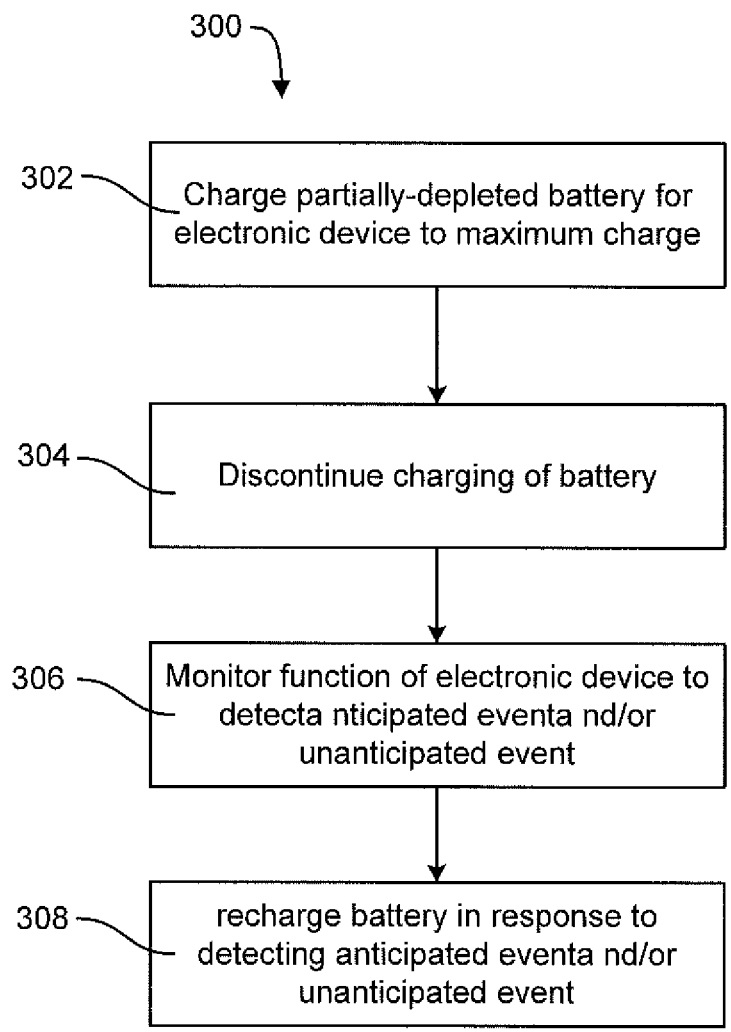
FIG. 3 shows a flowchart illustrating a method for charging a battery of an electronic device. This method may be performed on the battery of the electronic device as shown in FIGS. 1A and 1B.

Turning to FIG. 3, and with continued reference to FIGS. 1A-2B, a process for charging the battery 110 of the electronic device 100 (see FIGS. 1A and 1B) may now be discussed. Specifically, FIG. 3 is a flowchart depicting one sample method 300 for charging the battery 110 using the charging system 126 of the electronic device 100 or the charging device 200. That is, the sample method for charging the battery 110, as depicted in FIG. 3 and discussed herein, may be implemented by the charging system 126, regardless of the charging system 126 being included within the electronic device 100, or the charging device 200.

In operation 302, a partially-depleted battery 110 for electronic device 100 may be charged to a threshold charge value. The partially-depleted battery 110 may include any charge value that is below the maximum charge. That is, when the threshold charge value includes a fully charged (e.g., 100%) battery 110, partially-depleted battery 110 may include a charge value less than the maximum charge (e.g., 90-0%). The partially-depleted battery 110 of the electronic device 100 may be charged using the charging device 200 configured to be electrically coupled to the battery charging port 108 of the electronic device 100, when the charging device 200 may provide electrical currents to the electronic device 100. It is understood that the charge of the battery 110 may be depleted as a result of a variety of factors including, but not limited to: extended use of the electronic device 100, non-charging of the electronic device 100, and/or the operational life of the battery 110 for the electronic device 100.

In operation 304, the charging of the battery 110 of the electronic device 100 may be discontinued in response to the battery 110 being charged to the threshold charge value. That is, when the partially-depleted battery 110 of operation 302 is charged to the threshold charge value (e.g., 100%), the electric current provided to the electronic device 100 to charge the battery 110 may be discontinued. In response to the discontinuing of the charging of the battery 110 of the electronic device 100, the charge value of the battery 110 may gradually deplete. That is, as a result of discontinuing the charge to the battery 110, the charge value of the battery 110 may deplete or lessen from the threshold charge value over time.

As discussed herein, the charging system 126 may recognize that the battery 110 has been charged to the threshold charge value, and may subsequently discontinue the charge provided to the battery 110 in operation 302. That is, the charging system 126 may be in electronic communication with the power source 122 including the battery 110, and may monitor the charge value of the battery 110 to determine when the battery 110 is charged to the threshold charge value. When the charging system 126 determines that the battery 110 is charged to the threshold charge value, the charging system 126 may discontinue the charge.

The charging system 126 may discontinue the charge by stopping the electrical current from flowing from the charging device 200 (see FIG. 2A) to the electronic device 100. More specifically, the charging system 126, in electronic communication with the power source 122 and the battery 110, may discontinue the draw of electrical current from the charging device 200, which may ultimately stop current from flowing to the battery 110. In an alternative embodiment, the charging system 126 may be in electronic communication with an internal contact pins (not shown) of the electronic device 100 and/or contact pins 204 for the charging device 200 used for charging the battery 110. When the battery 110 is charged to the threshold charge value, the charging system 126 may temporarily disconnect the contact pins (e.g., contact pins 204), which may ultimately prevent the electrical current provided by the charging device 200 to reach the electronic device 100 and/or the battery 110.

In an alternative embodiment, when the charging device 200 includes an inductive or wireless system including the charging system 126, the charge to the battery 110 of the electronic device 100 may also be discontinued in response to the battery 110 being charged to the threshold charge value. More specifically, the charging system 126 of an inductive or wireless system may disconnect or discontinue the transmission of electrical current to the battery 110 of the electronic device 100, once the charging system 126 determines the battery 110 is charged to the threshold charge value.

As such, the discontinuing of the charge to the battery 110 in operation 304 may also include maintaining the electrical coupling between the charging device 200 and the battery 110 of the electronic device 100. That is, as a result of the charging system 126 controlling and/or discontinuing the charge provided to the battery 110, the charging device 200 may remain substantially coupled to the battery charging port 108 and may remain electrically coupled to the battery 110. As discussed herein, by maintaining the electrical coupling between the charging device 200 and the battery 110 of the electronic device 100, the charging system 126 may reactivate or recharge the battery 110.

In operation 306, a function of the electronic device 100 may be monitored to detect an anticipated event and/or an unanticipated event of the electronic device 100. That is, the charging system 126 may monitor the function, operation and/or interactions of the electronic device 100, when electrically coupled to the charging device 200, to detect anticipated and/or unanticipated events that may take place on or with respect to the electronic device 100.

The anticipated events of the electronic device 100 detected during the monitoring process in operation 306 may include a predetermined operation of the electronic device 100, and/or a reoccurring interaction with the electronic device 100.

For example, a predetermined operation of the electronic device 100 may be a scheduled alarm set on the electronic device 100. More specifically, the electronic device 100 may be configured to include a programmable alarm that may alert a user of the electronic device 100 at a predetermined time.

A reoccurring interaction with the electronic device 100 may be a learned and/or regular interaction a user may have with the electronic device 100. In an example, the reoccurring interaction with the electronic device 100 may include a substantially consistent, and regular times for coupling and uncoupling the charging device 200 to the electronic device 100. That is, the reoccurring interaction with the electronic device 100 may be learned by the charging system 126 when a user regularly couples the electronic device 100 to the charging device 200 at a first time, and uncouples the electronic device 100 from the charging device 200 at a second time.

The unanticipated events of the electronic device 100 detected during the monitoring process in operation 306 may include a spontaneous, unexpected interaction with the electronic device 100. As one example, an unanticipated event of the electronic device 100 may include a user randomly interacting with the electronic device 100 when the electronic device 100 is electrically coupled to the charging device 200. For example, when a user electrically couples the electronic device 100 to the charging device 200 while the user sleeps, an unanticipated event may include the user unexpectedly checking the time using the electronic device 100 after randomly waking-up.

In operation 308, the battery 110 of the electronic device 100 may be recharged in response to detecting one of an anticipated event and/or an unanticipated event. More specifically, the charging system 126 may reactivate or continue the charging of the battery 110 in response to detecting an anticipated event and/or an unanticipated event during the monitoring of the function of electronic device during operation 306. The detected anticipated event may occur a predetermined time subsequent to the recharging of the battery 110. That is, and as discussed herein, the recharging of the battery 110 may begin a predetermined time before the detected, anticipated event is expected to occur. Additionally, the detected unanticipated event may occur immediately before the recharging of the battery 110 of operation 308. More specifically, and discussed herein, the recharging of the battery 110 may begin immediately after the detected, unanticipated event occurs.

When an anticipated event is detected or predicted in operation 306, the recharging of the battery 110 in operation 308 may include charging the battery 110 to the threshold charge value (e.g., 100% charge) prior to the occurrence of the anticipated event. That is, when an anticipated event is expected to occur on the electronic device 100, the charging system 126 may begin to charge the battery 110 a predetermined time prior to the expected occurrence of the anticipated event to ensure the battery 110 is charged to the threshold charge value prior to the occurrence of the anticipated event. Additionally, when an anticipated event is detected in operation 306, the recharging of the battery 110 in operation 308 may include charging the battery 110 at a first rate prior to the occurrence of the anticipated event. That is, charging system 126 may be configured to provide the battery 110 a charge within a plurality of distinct charging rates, including a first charging rate, which may be used to charge the battery 110 when an anticipated event is detected. As such, during the recharging of the battery 110 of electronic device 100 in operation 308, the charging system 126 may begin to charge the battery 110 at a first rate, a predetermined time prior to the expected occurrence of the anticipated event. As can be understood, the predetermined time to begin recharging the battery 110 of the electronic device 100 may be determined based on a variety of operational functions of the electronic device 100 and/or the charging system 126 including, but not limited to the charging rate used to charge the battery 110 and the charge value of the partially depleted battery 110 (e.g., as in operation 304).

When an unanticipated event is detected in operation 306, the recharging of the battery 110 in operation 308 may include charging the battery 110 to the threshold charge value (e.g., 100%) or to a nearly threshold charge value, subsequent to the occurrence of the unanticipated event. That is, when the unanticipated event is detected on the electronic device 100, the battery 110 may be charged to the threshold charge value, or as close to the threshold charge value as possible after the unanticipated event occurs, but prior to the disconnection between the electronic device 100 and the charging device 200. Additionally, in detecting the unanticipated event in operation 306, the recharging of the battery 110 in operation 308 may include charging the battery 110 at a second rate, distinct from the first rate, immediately after the occurrence of the unanticipated event. As discussed above, the charging system 126 may be configured to provide the battery 110 a charge with a plurality of distinct charging rates. As such, when the unanticipated event is detected, the charging system 126 may charge the battery 110 at a second rate, distinct (e.g., greater) from the first rate, to charge the battery 110 to the threshold charge value, or as close to the threshold charge value as possible.

Although depicted in FIG. 3 and discussed herein as occurring subsequent to the charging in operation 302, and the discontinuing of the charge in operation 304, the monitoring of the function of the electronic device 100 in operation 306 may occur prior to, or simultaneous to, operation 302 and/or operation 304. That is, the monitoring in operation 306 may occur prior to the charging in operation 302 and/or the discontinuing of the charge in operation 304. Additionally, the monitoring in operation 306 may occur concurrently with the charging in operation 302 and/or the discontinuing of the charge in operation 304. As such, it is understood that the monitoring of operation 306 may occur any time between the electrical coupling of the charging device 200 and the electronic device 100, the recharging of the battery 110 in operation 308.

Figure 4:
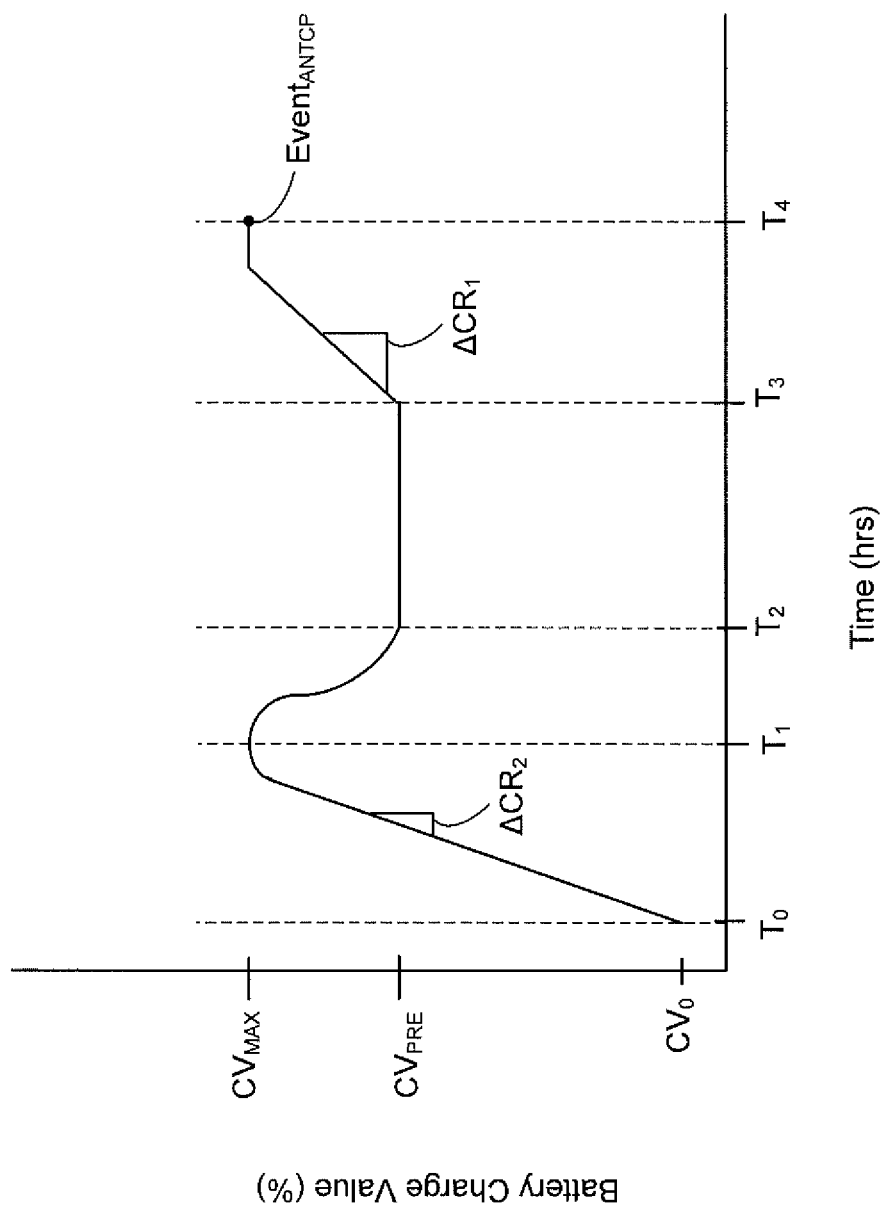
FIGS. 4-7 show illustrative linear graphs representing the method of charging a battery for an electronic device, as depicted in FIG. 3, according to various embodiments.

FIG. 4 shows an illustrative linear graph representing the method of charging the battery 110 for the electronic device 100, as depicted in FIG. 3. An example of charging the battery 110 of the electronic device 100 using the method depicted in FIG. 3 may now be discussed with respect to FIG. 4.

As shown in FIG. 4, the linear graph may represent the charge value of the battery 110 over a period of time. More specifically, the linear graph may represent the charge value of the battery 110 in electronic communication with the charging system 126, when the charge value of the battery 110 is determined and/or modified by the charging system 126, of the system discussed herein. In the example embodiment, as shown in FIG. 4 and discussed herein, an anticipated event may be detected by the charging system 126.

The charging system 126 may determine that the electronic device 100 may be electrically coupled to the charging device 200 at initial time $T_0$ to charge the battery 110. As shown in FIG. 4, at initial time $T_0$, the charging system 126 may determine that the battery 110 may be partially-depleted to include an initial charge value ($CV_0$) less than the threshold charge value for the battery 110. The initial charge value ($CV_0$) may be any charge value that is less than the threshold charge value for the battery 110. As discussed herein, the threshold charge value may be any predetermined charge value for the battery 110 of the electronic device 100. In a non-limiting example, as shown in FIG. 4, threshold charge value may include a maximum charge value ($CV_{MAX}$) (e.g., 100%) for the battery 110. As a result of determining the battery 110 includes an initial charge value ($CV_0$) less than the threshold charge value ($CV_{MAX}$), the charging system 126 may begin to charge the battery 110. More specifically, as shown in FIG. 4, the charging system 126 may begin to charge the battery 110 over a period of time, such that the battery 110 may eventually include a charge value equal to the threshold charge value ($CV_{MAX}$). As shown in FIG. 4, the battery 110 may be charged to include the threshold charge value ($CV_{MAX}$) at a charge time $T_1$. The charging of the battery 110 between the electrical coupling at initial time $T_0$ and threshold charge value of battery 110 at the charge time $T_1$ may corresponding to the charging in operation 302 of FIG. 3.

It is understood, that the threshold charge value may include any predetermined charge value for the battery 110 of the electronic device 100. More specifically, the threshold charge value may include a predetermined charge value for the battery 110 that is less than the maximum charge value ($CV_{MAX}$), as shown in FIG. 4. In a non-limiting example, the threshold charge value for the battery 110 may include a 90% charge. That is, and as similarly discussed herein, it may be determined that the battery 110 includes an initial charge value ($CV_0$) less than the threshold charge value of 90% of the charge of the battery 110. As a result, the charging system 126 may begin to charge the battery 110 to eventually include a charge value equal to the threshold charge value (e.g., 90%).

As shown in FIG. 4, the charging system 126 may charge the battery 110 at a second charge rate ($\Delta CR_2$), which may be greater than a first charge rate ($\Delta CR_1$), as discussed herein. The charging system 126 may initially charge the battery 110 at the increased, second charge rate ($\Delta CR_2$) between time $T_0$ and $T_1$ to achieve the threshold charge value ($CV_{MAX}$) for the battery 110 as quickly as possible. When the battery 110 is being charged at the second charge rate ($\Delta CR_2$), the charging system 126 may be instructing or requesting the maximum amount of electrical current capable of being provided to the electronic device 100 and/or capable of being drawn by the charging device 200.

As shown in FIG. 4, once the battery 110 reaches the threshold charge value ($CV_{MAX}$) at the charge time $T_1$, charging system 126 may allow the charge value (CV) of the battery 110 to gradually deplete. That is, between charge time $T_1$ and charge time $T_2$, the charge value for the battery 110 of the electronic device 100 may gradually deplete from the threshold charge value ($CV_{MAX}$). The gradual depletion of the charge value of the battery 110 of the electronic device 100 may be a result of the charging system 126 discontinuing the charge of the battery 110 in response to the battery 110 being charged to the threshold charge value ($CV_{MAX}$) at charge time $T_1$. The discontinuing of the charge to the battery 110, and the depletion of the charge value between charge time $T_1$ and charge time $T_2$, as shown in FIG. 4, may corresponded to operation 304 in FIG. 3.

As discussed herein, the discontinuing of the charge to the battery 110 may be controlled by the charging system 126 while substantially maintaining the electrical coupling between the charging device 200 and the battery 110 of the electronic device 100. In maintaining the electrical coupling between the charging device 200 and the battery 110 of the electronic device 100, the charging system 126 may be able to reinitiate the charging of the battery 110 at any time during the charging process. That is, when the charging device 200 remains electrically coupled to and in electronic communication with the battery 110 of the electronic device 100, the charging system 126 may discontinue and/or recharge the battery 110 immediately after the detection of an event (e.g., unanticipated event) that may require the battery 110 to be charged to the threshold charge value ($CV_{MAX}$) instantaneously.

At charge time $T_2$, the charging system 126 may determine that the battery 110 includes a predetermined, partial charge value $CV_{PRE}$. That is, the charging system 126 may continuously monitor the charge value (CV) of the battery 110 after discontinuing the charge at charge time $T_1$, to identify when the charge value (CV) for the battery 110 equals the predetermined, partial charge value ($CV_{PRE}$) at charge time $T_2$. When the battery 110 includes the predetermined, partial charge value ($CV_{PRE}$), the charging system 126 may be configured to maintain the battery 110 at predetermined, partial charge value ($CV_{PRE}$). That is, subsequent to the discontinuing of the charge, and the resulting depletion of the charge value (CV) for the battery 110, the charging system 126 may be configured to detect and substantially maintain the battery 110 at the predetermined, partial charge value ($CV_{PRE}$). The charging system 126 may substantially maintain the predetermined, partial charge value ($CV_{PRE}$) for the battery 110 between second charge time $T_2$ and charge time $T_3$. More specifically, as shown in FIG. 4, between charge time $T_2$ and charge time $T_3$, the charging system 126 may allow the charging device 200 to provide a temporary, partial-charge to the battery 110, when the partial-charge substantially maintains the predetermined, partial charge value ($CV_{PRE}$) for the battery 110. That is, the partial-charge provided to the battery 110 between charge time $T_2$ and charge time $T_3$ may substantially maintain the predetermined, partial charge value ($CV_{PRE}$) and may not substantially fluctuate from the predetermined, partial charge value ($CV_{PRE}$).

Figure 5:
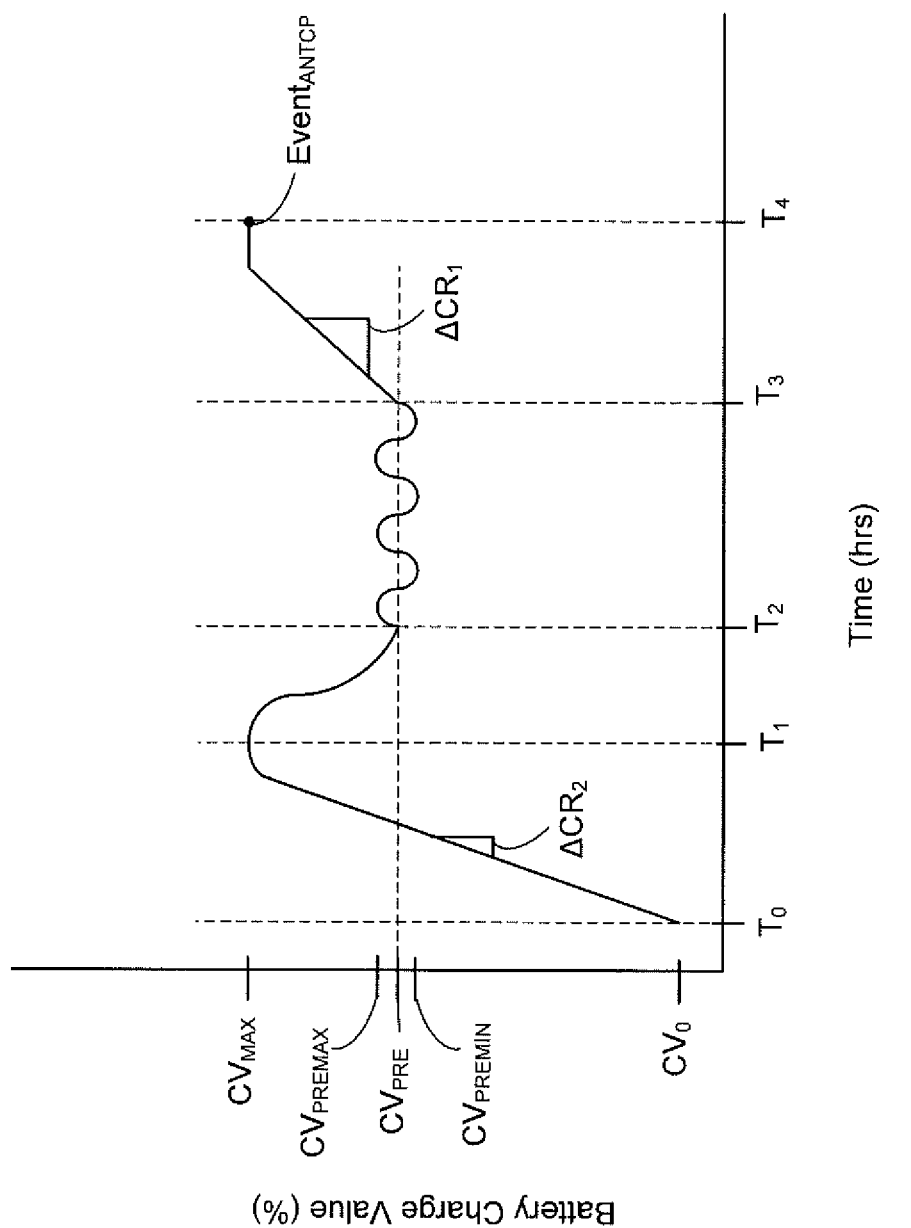

Briefly turning to FIG. 5, an alternative embodiment for maintain the predetermined, partial charge value ($CV_{PRE}$) may be shown. Specifically, as shown in FIG. 5, between charge time $T_2$ and charge time $T_3$, the charging system 126 may maintain an average predetermined, partial charge value ($CV_{PRE}$) for the battery 110 by fluctuating the charge value of the battery 110 between a maximum predetermined, partial charge value ($CV_{PREMAX}$), and a minimum predetermined, partial charge value ($CV_{PREMIN}$). As shown in FIG. 5, both the maximum predetermined, partial charge value ($CV_{PREMAX}$), and the minimum predetermined, partial charge value ($CV_{PREMIN}$) may be substantially below the threshold charge value ($CV_{MAX}$) for the battery 110, to substantially prevent negatively effecting the life of the battery 110, as discussed herein. The charging system 126 may fluctuate the charge value (CV) for the battery 110 between the maximum predetermined, partial charge value ($CV_{PREMAX}$), and the minimum predetermined, partial charge value ($CV_{PREMIN}$) by repeatedly charging and discontinuing the charging of the battery 110, as discussed herein.

As discussed herein, the predetermined, partial charge value ($CV_{PRE}$) for the battery 110 of the electronic device 100 may be dependent upon the charge rate (e.g., first charge rate, second charge rate) applied by the charging system 126 for recharging the battery 110. More specifically, and as discussed herein, dependent upon the detection of an anticipated event and/or an unanticipated event, and the corresponding charge rate associated with the respective events, the charging system 126 may adjust the charge value (CV) for the predetermined, partial charge value ($CV_{PRE}$) for the battery 110.

Returning to FIG. 4, at any time between the initial time $T_0$ of electrically coupling the battery 110 of the electronic device 100 to the charging system 126 and charge time $T_3$, the charging system 126 may monitor the functions of the electronic device 100 to detect the anticipated event (Event$_{ANTCP}$). That is, and as discussed herein, the charging system 126 may monitor the functions of the electronic device 100 prior to, during, or subsequent to the charging of the battery 110 (e.g., $T_0$-$T_1$), the discontinuing of the charge to the battery 110 (e.g., $T_1$-$T_2$) and/or the maintaining of the predetermined, partial charge value ($CV_{PRE}$) of the battery 110 (e.g., $T_2$-$T_3$) to detect the anticipated event (Event$_{ANTCP}$).

As shown in FIG. 4, the charging system 126 may monitor the function of the electronic device 100 to detect the anticipated event (Event$_{ANTCP}$) is expected to occur at charge time $T_4$. That is, the charging system 126 may interact with other components of the electronic device 100 (e.g., memory 114 and the processing device 112) to determine that the electronic device 100 has an anticipated event (Event$_{ANTCP}$) that may be expected to occur at charge time $T_4$. In a non-limiting example, the anticipated event (Event$_{ANTCP}$) occurring at charge time $T_4$ may include an alarm of the electronic device 100 scheduled for charge time $T_4$. the monitoring to detect anticipated event (Event$_{ANTCP}$) at charge time $T_4$ may correspond to operation 306 in FIG. 3.

As shown in FIG. 4, between charge time $T_3$ and charge time $T_4$ the battery 110 may be recharged to the threshold charge value ($CV_{MAX}$). More specifically, the charging system 126 may allow the charging device 200 to recharge the battery 110 at a first charging rate ($\Delta CR_1$) to the threshold charge value ($CV_{MAX}$) prior to the occurrence of the anticipated event (Event$_{ANTCP}$) at charge time $T_4$. By charging the battery 110 at first charging rate ($\Delta CR_1$), rather than the increased, second charging rate ($\Delta CR_2$), battery 110 may be charged to threshold charge value ($CV_{MAX}$) using less electrical current. That is, when the charging system 126 detects anticipated event (Event$_{ANTCP}$), and may recharge the battery 110 to threshold charge value ($CV_{MAX}$) over a predetermined time, as discussed below, the charging system 126 may charge the battery 110 at first charging rate ($\Delta CR_1$).

Because first charging rate ($\Delta CR_1$) requires less electrical current from the charging device 200, the charging of the battery 110 may reduce the home-electrical cost of charging the battery 110, and/or may also allow the battery 110 to be charged with an electrical current below the maximum allowed current for the electronic device 100. This may ultimately, provide less electrical stress to the battery 110 and/or the electronic device 100 during the charging process discussed herein. The recharging of the battery 110 between the third charge time T3 and the fourth charge time T4 may correspond to operation 308 in FIG. 3.

As shown in FIG. 4, and discussed herein, the time between charge time $T_3$ and charge time $T_4$ may be the predetermined time for charging the battery 110, which may be dependent upon the anticipated event, the predetermined, partial charge value ($CV_{PRE}$) and/or the rate of charging the battery 110 prior to the anticipated event (Event$_{ANTCP}$). That is, the charging system 126 may determine that the charging device 200 may begin charging the battery 110 at charge time $T_3$, as a result of the battery 110 being charged at the first charge rate and/or the anticipated event (Event$_{ANTCP}$) expected to occur at charge time $T_4$.

As shown in FIG. 4, by determining and beginning the recharging of the battery 110 at charge time $T_3$, the charging system 126 may ensure that the battery 110 is charged and maintained at the threshold charge value ($CV_{MAX}$) prior to the anticipated event (Event$_{ANTCP}$). As a result, when the anticipated event (Event$_{ANTCP}$) occurs, and the electronic device 100 is immediately uncoupled from the charging device 200 at charge time $T_4$, the battery 110 of the electronic device 100 may include the threshold charge value ($CV_{MAX}$), and may only have reached the threshold charge value ($CV_{MAX}$) twice during the charging process performed by charging system 126 (e.g., $T_0$-$T_4$).

Figure 6:
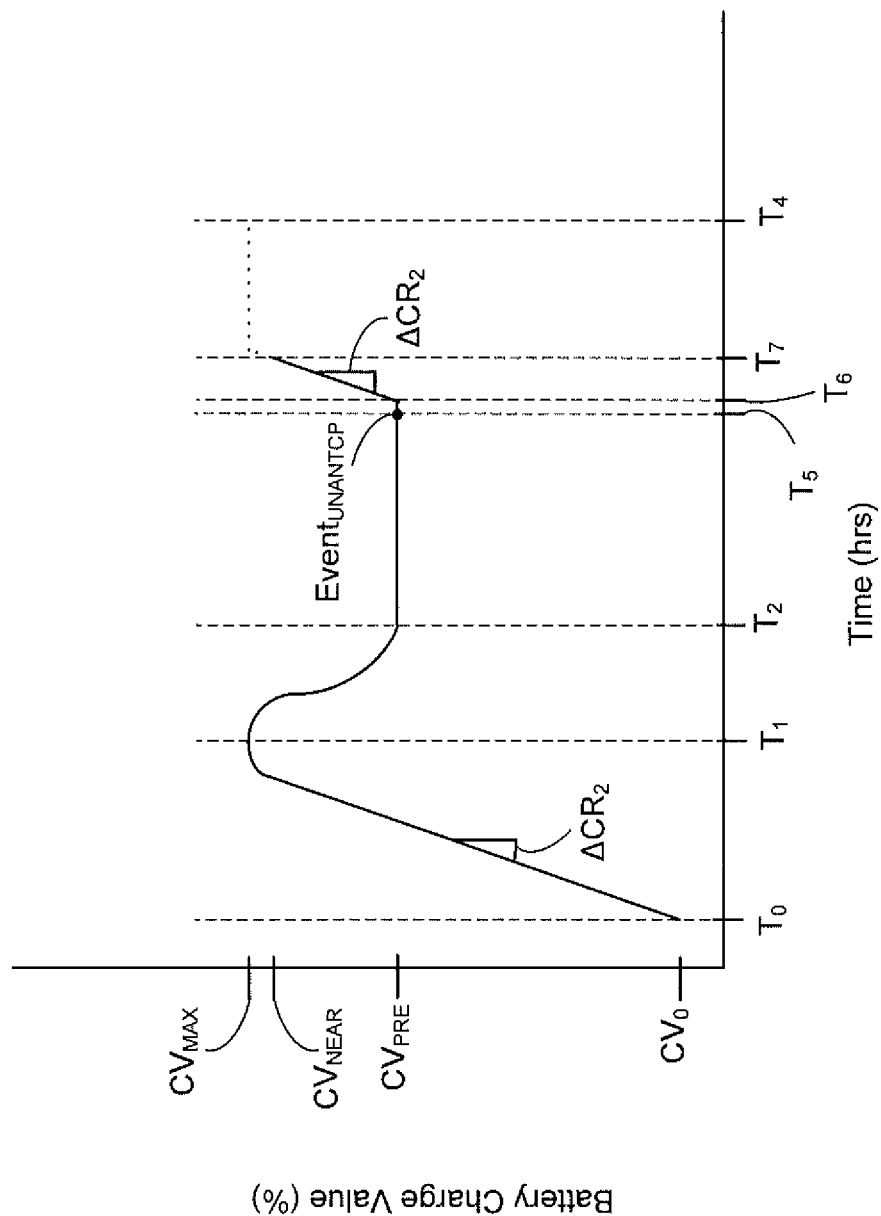

Turning to FIG. 6, a linear graph, according to an alternative embodiment, may represent the charge value of the battery 110 in electronic communication with the charging system 126, when the charge value of the battery 110 is determined and/or modified by the charging system 126, of the system discussed herein. In the embodiment, as shown in FIG. 6 and discussed herein, an unanticipated event (Event$_{UNANTCP}$) may be detected by the charging system 126.

As shown in FIG. 6, the linear graph representing the charge value for the battery 110 of the electronic device 100 may function and/or may undergo processes by the charging system 126 similar to those discussed in FIG. 4. That is, the linear graph illustrated in FIG. 6 may be substantially identical to the linear graph in FIG. 4 between the initial time $T_0$ and charge time $T_2$. The similarity may be a result of the charging system 126 performing substantially similar, initial processes (e.g., charging, discontinuing the charging, etc.) with respect to an anticipated event (Event$_{ANTCP}$) (see, FIG. 4) and an unanticipated event (Event$_{UNANTCP}$) (FIG. 6). As such, redundant explanation of the charge value for the battery 110, as shown in FIG. 6 between the initial time $T_0$ and charge time $T_2$ is omitted for clarity.

However, and in comparison to FIG. 4, after charge time $T_2$, and specifically, during the maintaining of the predetermined, partial charge value ($CV_{PRE}$) of the battery 110, the unanticipated event (Event$_{UNANTCP}$) may be detected by the charging system 126. More specifically, the charging system 126 may continuously monitor the function of the electronic device 100, and ultimately may detect the occurrence of the unanticipated event (Event$_{UNANTCP}$) at charge time $T_5$. As discussed herein, the unanticipated event (Event$_{UNANTCP}$) may include a spontaneous or unexpected interaction with the electronic device 100 while the electronic device 100 is undergoing the charging processes discussed herein with respect to FIG. 3. In a non-limiting example, the unanticipated event (Event$_{UNANTCP}$), as shown in FIG. 6, may include a user unexpectedly checking the time using the electronic device 100 after randomly waking up in the middle of the night.

As shown in FIG. 6, once the unanticipated event (Event$_{UNANTCP}$) is detected, the charging system 126 may begin the recharging of the battery 110. That is, immediately subsequent to the detection and/or occurrence of the unanticipated event (Event$_{UNANTCP}$) at charge time $T_5$, the charging system 126 may allow the charging device to provide current to the battery 110 at charge time $T_6$ to recharge the battery 110 to the threshold charge value ($CV_{MAX}$), or close to the threshold charge value ($CV_{MAX}$).

The charging system 126 may allow the battery 110 to be charged at the second charge rate ($\Delta CR_2$), which may be greater than the first charge rate ($\Delta CR_1$) (see, FIG. 4). More specifically, the charging system 126 may allow the battery 110 to be charged at the second charge rate ($\Delta CR_2$) so the battery 110 may be charged to the threshold charge value ($CV_{MAX}$) or as close to it as possible, over, for example, the shortest possible duration of time. That is, because of the spontaneity of unanticipated event (Event$_{UNANTCP}$), and/or the inability of the charging system 126 to detect the unanticipated event (Event$_{UNANTCP}$) until after the event occurs, it may not be determined how long the electronic device 100 will remain electrically coupled to charging device after the occurrence unanticipated event (Event$_{UNANTCP}$). As such, the charging system 126 may charge the battery 110 at the greater, second charge rate (ΔCR$_2$), in order for the battery 110 to include a greater charge value prior to the uncoupling of the electronic device 100 and the charging device 200.

As shown in FIG. 6, the battery 110 may be charged at the second charge rate (ΔCR$_2$) between charge time T$_6$ and charge time T$_7$, where at charge time T$_7$, the electronic device 100 may be uncoupled from the charging device 200. As a result of uncoupling the electronic device 100 from the charging device 200 at charge time T$_7$, the battery 110 may not be completely charged to the threshold charge value (CV$_{MAX}$), but may only be charged to a nearly threshold charge value (CV$_{NEAR}$). However, as shown in phantom in FIG. 6, if the electronic device 100 remained electrically coupled to the charging device 200 until charge time T$_4$, the battery 110 may be charged to the threshold charge value (CV$_{MAX}$), as similarly discussed with respect to FIG. 4.

Figure 7:
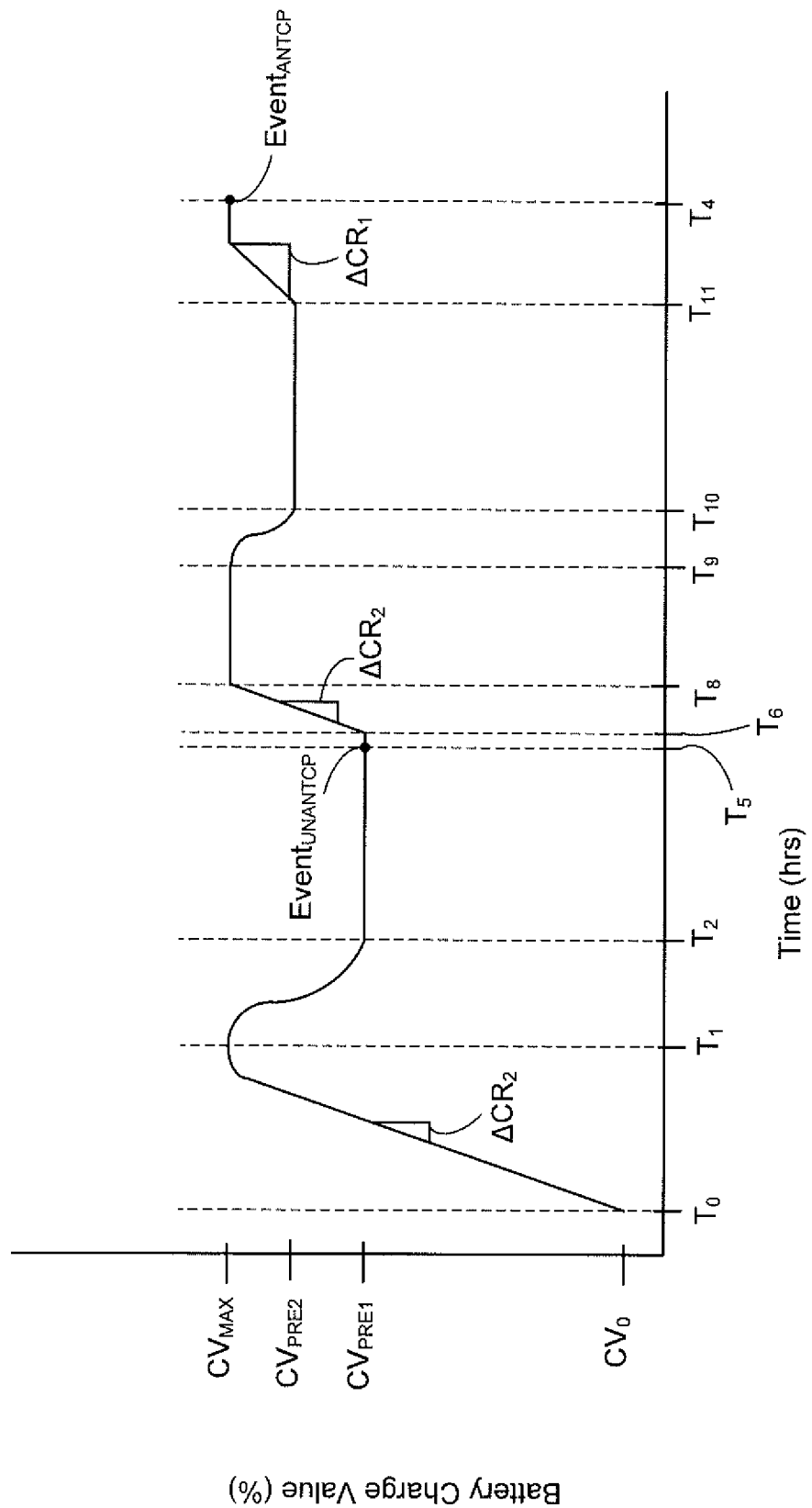

In an additional embodiment, the charging system 126 may detect both an anticipated event (Event$_{ANTCP}$) and an unanticipated event (Event$_{UNANTCP}$) while the battery 110 is in electronic communication within the charging system 126. That is, as shown in FIG. 7, which the battery 110 of the electronic device 100 is in electronic communication with the charging system 126, both an anticipated event (Event$_{ANTCP}$) and an unanticipated event (Event$_{UNANTCP}$) may be detected by the charging system 126. When both an anticipated event (Event$_{ANTCP}$) and an unanticipated event (Event$_{UNANTCP}$) are detected by the charging system 126, the predetermined, partial charge value (CV$_{PRE}$) substantially maintained by the charging system 126 may vary.

In the example embodiment shown in FIG. 7, a non-limiting example of an anticipated event (Event$_{ANTCP}$) may include an alarm on the electronic device 100, as discussed above with respect to FIG. 4. Additionally, a non-limiting example of an unanticipated event (Event$_{UNANTCP}$) may include a user unexpectedly checking the time using the electronic device 100 while the battery 110 is in electronic communication with the charging system 126, as discussed above with respect to FIG. 6.

The linear graph representing the charge value for the battery 110 of the electronic device 100 in FIG. 7 may function and/or may undergo processes by the charging system 126 similar to those discussed in FIGS. 4 and/or 6. More specifically, as discussed above with respect to FIGS. 4 and/or 6, the battery 110 may be electrically coupled with the charging system 126 at initial time T$_0$, and may be charged to the threshold charge value (CV$_{MAX}$) between initial time T$_0$ and charge time T$_1$. Additionally, as similarly discussed with respect to FIG. 4, the charging system 126 may detect the anticipated event (Event$_{ANTCP}$) at charge time T$_4$ by monitoring the function of the electronic device 100. Finally, and as similarly discussed with respect to FIG. 6, the charging system 126 may detect the unanticipated event (Event$_{UNANTCP}$) at charge time T$_5$ and may immediately allow the battery 110 to be recharged at the second charge rate (ΔCR2) at charge time T$_6$.

As shown in FIG. 7, between charge time T$_5$ and charge time T$_6$, the charging system 126 may maintain the battery 110 at a first predetermined, partial charge value (CV$_{PRE1}$).

The first predetermined, partial charge value (CV$_{PRE1}$) may be substantially equal to a predetermined, partial charge value (CV$_{PRE}$) determined by the charging system 126, when an anticipated event (Event$_{ANTCP}$) is detected (see, FIG. 4). That is, and as discussed herein, when an anticipated event (Event$_{ANTCP}$) is detected by the charging system 126 at charge time T$_4$, the charging system 126 may allow the battery 110 to deplete to first predetermined, partial charge value (CV$_{PRE1}$) at charge time T$_2$, and may substantially maintain first predetermined, partial charge value (CV$_{PRE1}$) until a time when recharging of the battery 110 is required (e.g., T$_4$, T$_6$), as discussed herein.

As similarly discussed herein with respect to FIG. 6, the charging system 126 may allow the charging device 200 to begin charging the battery 110 to the threshold charge value (CV$_{MAX}$) at charge time T$_6$. As shown in FIG. 7, the battery 110 may be charged to the threshold charge value (CV$_{MAX}$) at charge time T$_8$ and may be subsequently maintained at the threshold charge value (CV$_{MAX}$). The battery 110 may be maintained at the threshold charge value (CV$_{MAX}$) in anticipation of the battery 110 of the electronic device 100 being uncoupled from the charging device 200 by the user. However, if the battery 110 remains in electronic communication with the charging device 200 for a predetermined time, the charging system 126 may again discontinue the charge to the battery 110 and may allow the charge value of the battery 110 to begin to deplete. The predetermined time may be indicated by the time between charge time T$_8$ and charge time T$_9$, where at charge time T$_9$, the charging system 126 may discontinue the charge supplied to the battery 110 by the charging device 200, and may allow the charge value (CV) of the battery 110 to deplete, as similarly discussed with respect to FIG. 4 between charge time T$_1$ and charge time T$_2$.

The charging system 126 may allow charging value (CV) to deplete until charge time T$_{10}$, when the charge value (CV) for the battery 110 is equal to a second predetermined, partial charge value (CV$_{PRE2}$). As shown in FIG. 7, the second predetermined, partial charge value (CV$_{PRE2}$) for the battery 110 may be substantially greater than the first predetermined, partial charge value (CV$_{PRE1}$) between charge time T$_2$ and T$_5$. The charging system 126 may adjust the predetermined, partial charge value (CV$_{PRE}$) for the battery 110 in response to the detecting of the unanticipated event (Event$_{UNANTCP}$) at charge time T$_5$. That is, and as discussed herein, the predetermined, partial charge value (CV$_{PRE}$) for the battery 110 may be dependent upon, at least in part, the charge rate (ΔCR) for recharging the battery 110 and/or the detection of an anticipated event (Event$_{ANTCP}$) and/or an unanticipated event (Event$_{UNANTCP}$) by the charging system 126. As such, and as shown in FIG. 7, the first predetermined, partial charge value (CV$_{PRE1}$) determined by the charging system 126 may be dependent on the detection of the anticipated event (Event$_{ANTCP}$) expected to occur at charge time T$_4$. However, the detection and/or the occurrence of the unanticipated event (Event$_{UNANTCP}$) at charge time T$_5$ by the charging system 126 may result in the charging system 126 to adjust the predetermined, partial charge value (CV$_{PRE}$) to the second predetermined, partial charge value (CV$_{PRE2}$). The charging system 126 may adjust to the second predetermined, partial charge value (CV$_{PRE2}$) to relatively ensure that subsequent recharging processes performed on the battery 110 may result in the battery 110 including the threshold charge value (CV$_{MAX}$) before the anticipated event (Event$_{ANTCP}$) occurs and/or the battery 110 is uncoupled from the charging device 200. That is, by maintaining the battery 110 at the second predetermined, partial charge value ($CV_{PRE2}$), which may be greater than the first predetermined, partial charge value ($CV_{PRE1}$), the battery 110 may be more quickly charged to the threshold charge value ($CV_{MAX}$) when another unanticipated event ($Event_{UNANTCP}$) occurs, and/or before an anticipated event ($Event_{ANTCP}$) occurs.

The second predetermined, partial charge value ($CV_{PRE2}$) for the battery 110 may be substantially maintained by the charging system 126 between charge time $T_{10}$ and $T_{11}$, as similarly discussed herein with respect to FIG. 4 between charge time $T_2$ and charge time $T_3$. That is, the charging system 126 may maintain the second predetermined, partial charge value ($CV_{PRE2}$) for the battery 110, without the detection of a distinct unanticipated event ($Event_{UNANTCP}$). As similarly discussed herein with respect to FIG. 4 between charge time $T_3$ and $T_4$, the charging system 126 may allow the charging device 200 to recharge the battery 110 at charge time $T_{11}$. More specifically, at charge time $T_{11}$, the charging system 126 may begin to charge the battery 110 at a first charge rate ($\Delta CR_1$) to the threshold charge value ($CV_{MAX}$), and may substantially maintain the battery 110 at the threshold charge value ($CV_{MAX}$) prior to the occurrence of the anticipated event ($Event_{ANTCP}$) at charge time $T_4$. As similarly discussed herein with respect to FIG. 4, the time duration between charge time $T_{11}$ and $T_4$ may represent the predetermined time for recharging the battery 110 to ensure the battery 110 will include the threshold charge value ($CV_{MAX}$) prior to the occurrence of the anticipated event ($Event_{ANTCP}$).

By utilizing the charging system 126 to charge the battery 110 of the electronic device 100, the charging of the battery 110 may be dependent upon the monitoring and/or the occurrence of events (e.g., anticipated, unanticipated) of the electronic device 100, and not cycling between threshold charge values and minimum charge values. As a result, the charging system 126 utilized by the electronic device 100 may substantially prevent undesirable depletion of the battery's 110 ability to maintain a charge. That is, by eliminating the cycling charging of the battery 110 of the electronic device 100, the charging system 126 utilized by the electronic device 100 may minimize and substantially prevent the depletion of the battery's 110 ability to maintain a charge.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. An electronic device comprising:
 a battery; and
 a charging system in electronic communication with the battery, the charging system configured to:
  initiate a charging of the battery;
  discontinue the charging, thereby causing depletion of the battery;
  predict an event time of an event of the electronic device;
  determine, based on the event time, a charge time at which the charging system should reinitiate the charging; and
  reinitiate, at the charge time, the charging of the battery.

2. The electronic device of claim 1, wherein the charge time is after the event time.

3. The electronic device of claim 2, wherein the event comprises a spontaneous interaction with the electronic device.

4. The electronic device of claim 1, wherein the charge time is immediately after the event time.

5. The electronic device of claim 1, wherein the charge time is prior to the event time.

6. The electronic device of claim 5, wherein the event is an alarm of the electronic device.

7. The electronic device of claim 1, wherein the charging system is configured to discontinue the charging in response to the battery being charged to a threshold charge value.

8. A charging device for an electronic device, the charging device comprising:
 a connection portion configured to couple to a battery of the electronic device; and
 a charging system in electronic communication with the connection portion and configured to:
  initiate a charging of the battery;
  discontinue the charging, thereby causing depletion of the battery;
  predict an event time of an event of the electronic device;
  determine, based on the event time, a charge time at which the charging system should reinitiate the charging; and
  reinitiate, at the charge time, the charging of the battery.

9. The charging device of claim 8, wherein the charge time is after the event time.

10. The charging device of claim 9, wherein the charge time is immediately after the event time.

11. The charging device of claim 9, wherein the event comprises a spontaneous interaction with the electronic device.

12. The charging device of claim 8, wherein the charge time is prior to the event time.

13. The charging device of claim 12, wherein the event is an alarm of the electronic device.

14. The charging device of claim 8, wherein the charging system is configured to discontinue the charging in response to the battery being charged to a threshold charge value.

15. A method for charging a battery of an electronic device, the method comprising:
 initiating a charging of the battery of the electronic device;
 discontinuing the charging, thereby causing depletion of the battery;
 predicting an event time of an event of the electronic device;
 determining, based on the event time, a charge time at which the charging should be reinitiated; and
 reinitiating, at the charge time, the charging of the battery.

16. The method of claim 15, wherein discontinuing the charging occurs in response to the battery being charged to a first threshold charge value.

17. The method of claim 16, further comprising, after reinitiating the charging at the charge time, discontinuing the charging in response to the battery being charged to a second threshold charge value.

18. The method of claim 17, wherein the first threshold charge value is equal to the second threshold charge value.

19. The method of claim 17, wherein the first threshold charge value is different from the second threshold charge value.

20. The method of claim 15, wherein the event comprises at least one of an alarm of the electronic device or a spontaneous interaction with the electronic device.

* * * * *